US012661903B2

(12) United States Patent
Ogawa et al.

(10) Patent No.: US 12,661,903 B2
(45) Date of Patent: Jun. 23, 2026

(54) INKJET PRINTING APPARATUS

(71) Applicant: SCREEN Holdings Co., Ltd., Kyoto (JP)

(72) Inventors: Akihiro Ogawa, Kyoto (JP); Hideaki Onishi, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 157 days.

(21) Appl. No.: 18/589,253

(22) Filed: Feb. 27, 2024

(65) Prior Publication Data

US 2024/0316946 A1 Sep. 26, 2024

(30) Foreign Application Priority Data

Mar. 23, 2023 (JP) ................................ 2023-047259

(51) Int. Cl.
*B41J 2/18* (2006.01)
*B41J 2/045* (2006.01)
*B41J 2/175* (2006.01)

(52) U.S. Cl.
CPC ............ *B41J 2/18* (2013.01); *B41J 2/04563* (2013.01); *B41J 2/04573* (2013.01); *B41J 2/04581* (2013.01); *B41J 2/17596* (2013.01)

(58) Field of Classification Search
CPC .................................................. B41J 2/04528
See application file for complete search history.

(56) References Cited

U.S. PATENT DOCUMENTS

2005/0219282 A1* 10/2005 Kachi ...................... B41J 2/175 347/6
2007/0229599 A1* 10/2007 Nitta .................... B41J 2/04563 347/56
2008/0284809 A1* 11/2008 Okawa ................. B41J 2/04515 347/17
2010/0283808 A1* 11/2010 Terakado .................. B41J 2/18 347/6
2022/0339931 A1* 10/2022 Jackson ............... B41J 2/04588
2025/0206030 A1* 6/2025 Coutts ...................... B41J 29/02

FOREIGN PATENT DOCUMENTS

JP 2015-027748 A 2/2015

* cited by examiner

*Primary Examiner* — Shelby L Fidler
(74) *Attorney, Agent, or Firm* — Rimon P.C.

(57) ABSTRACT

An inkjet printing apparatus includes an ejection head, an ink supplier, a heater unit, an ejection amount calculator, and a first heater controller. The ejection head includes a plurality of the nozzles for ejecting ink to a surface of a printing base material. The ink supplier supplies the ink to the ejection head. The heater unit heats the ink to be supplied to the ejection head. The ejection amount calculator calculates an ejection amount of the ink to be ejected from the ejection head at a moment after the present moment on the basis of printing data indicating an image to be recorded on the printing base material. The first heater controller controls the heater unit on the basis of the ejection amount calculated by the ejection amount calculator.

12 Claims, 7 Drawing Sheets

INKJET PRINTING APPARATUS

RELATED APPLICATIONS

This application claims the benefit of Japanese Application No. 2023-047259, filed on Mar. 23, 2023, the disclosure of which is incorporated by reference herein.

BACKGROUND OF THE INVENTION

Field of the Invention

A subject matter disclosed in this specification relates to an inkjet printing apparatus.

Description of the Background Art

A conventionally-known printing apparatus forms an image on a base material of a continuous form by ejecting ink on a surface of the base material from an ejection head while transporting the base material in a roll-to-roll system. Generally, a printing apparatus of this type regards control over ink viscosity as an important issue. If the temperature of ink decreases, for example, the viscosity of the ink increases to cause ejection non-uniformity. This may cause a trouble such as deviation of a landing position of the ink or the occurrence of a streak. In response to this, a heater for heating the ink may be provided for the purpose of keeping a constant ink temperature (Japanese Patent Application Laid-Open No. 2015-027748, for example).

SUMMARY OF THE INVENTION

Technical Problem

It is generally desirable that a heater with a large heater capacity be mounted in order to keep a constant ink temperature while reducing power consumption by the heater. However, a heater with a large heater capacity is generally difficult to get hot and difficult to get cold. Hence, using a heater with a large heater capacity may cause delay in heating and cooling of the heater, causing a risk of overcooling or overheating of ink.

An object of the present invention is to provide a technique capable of reducing the occurrence of overcooling or overheating of ink by a heater even if the used heater has a large heater capacity.

Solution to Problem

To solve the above-described problem, a first aspect is intended for an inkjet printing apparatus comprising: at least one ejection head with a plurality of nozzles for ejecting ink to a surface of a printing base material; an ink supplier that supplies the ink to the ejection head; a heater unit that heats the ink to be supplied to the ejection head; an ejection amount calculator that calculates an ejection amount of the ink to be ejected from the ejection head at a moment after the present moment on the basis of printing data indicating an image to be recorded on the printing base material; and a first heater controller that controls the heater unit on the basis of the ejection amount calculated by the ejection amount calculator.

According to a second aspect, in the inkjet printing apparatus according to the first aspect, the ejection amount calculator calculates a total ejection amount of the ink to be ejected from the ejection head in a certain period after the present moment, and the first heater controller controls the heater unit on the basis of the total ejection amount calculated by the ejection amount calculator.

According to a third aspect, in the inkjet printing apparatus according to the second aspect, the first heater controller determines control start timing for controlling the heater unit on the basis of the ejection amount calculated by the ejection amount calculator and the heater capacity of the heater unit, and controls the heater unit in coincidence with arrival of the control start timing thereby determined.

According to a fourth aspect, the inkjet printing apparatus according to the first aspect or the second aspect further comprises an entrance temperature measuring part that measures an entrance temperature of the ink to be fed to the heater unit on an entrance side of the heater unit, wherein the first heater controller controls the heater unit on the basis of the entrance temperature further measured by the entrance temperature measuring part.

According to a fifth aspect, in the inkjet printing apparatus according to the first aspect or the second aspect, the ink supplier includes: a supply tank that stores the ink to be supplied to the ejection head; and a supply pipe that forms connection between the supply tank and the ejection head.

According to a sixth aspect, in the inkjet printing apparatus according to the fifth aspect, the ink supplier further includes: a recovery tank that stores the ink recovered from the ejection head; a connection pipe that forms connection between the recovery tank and the supply tank; and a circulation pump provided in the connection pipe and used for feeding the ink from the recovery tank to the supply tank.

According to a seventh aspect, in the inkjet printing apparatus according to the sixth aspect, the ink supplier further includes: a replenishment tank that stores the ink to be added to the supply tank; a replenishment pipe that forms connection between the replenishment tank and the connection pipe; and a replenishment pump provided in the replenishment pipe and used for feeding the ink in the replenishment tank to the connection pipe.

According to an eighth aspect, in the inkjet printing apparatus according to the seventh aspect, the heater unit is located between a connection point to which the replenishment pipe is connected and the supply tank along the connection pipe.

According to a ninth aspect, the inkjet printing apparatus according to the first aspect or the second aspect further comprises a replenishment temperature measuring part that measures a replenishment temperature of the ink to be added from the replenishment tank to the supply tank, wherein the first heater controller controls the heater unit on the basis of the replenishment temperature further measured by the replenishment temperature measuring part.

According to a tenth aspect, the inkjet printing apparatus according to the first aspect or the second aspect further comprises: an exit temperature measuring part that measures the temperature of the ink discharged from the heater unit on an exit side of the heater unit; and a second heater controller that controls the heater unit on the basis of the temperature of the ink measured by the exit temperature measuring part.

According to an eleventh aspect, in the inkjet printing apparatus according to the first aspect or the second aspect, the first heater controller judges whether a variation amount indicating variation in the ejection amount calculated by the ejection amount calculator exceeds a threshold, and if the variation amount is judged to exceed the threshold, the first heater controller controls the heater unit on the basis of the ejection amount.

According to a twelfth aspect, the inkjet printing apparatus according to the first aspect or the second aspect comprises a plurality of the ejection heads, wherein the ejection amount calculator calculates ejection amounts of the ink to be ejected from the plurality of ejection heads.

In the inkjet printing apparatus of the first aspect, as the heater unit is controlled on the basis of the ejection amount at the moment after the present moment, it is possible to reduce delay in heating or cooling the heater unit in response to variation in the ejection amount. This makes it possible to reduce the occurrence of overcooling or overheating of the ink by the heater unit even if the used heater unit has a large heater capacity.

In the inkjet printing apparatus of the second aspect, calculating the total ejection amount in the certain period makes it possible to determine variation in the ejection amount with high accuracy, thereby allowing the heater unit to be controlled properly.

In the inkjet printing apparatus of the third aspect, the control start timing is determined on the basis of the heater capacity. Thus, even if the used heater unit has a large heater capacity, it is still possible to reduce the occurrence of overcooling or overheating of the ink by the heater unit.

In the inkjet printing apparatus of the fourth aspect, controlling the heater unit on the basis of the entrance temperature allows the ink to be maintained at a suitable temperature.

In the inkjet printing apparatus of the fifth aspect, as the ink is stored in the supply tank, it is possible to reduce variation in the temperature of the ink to be supplied to the ejection head.

In the inkjet printing apparatus of the sixth aspect, circulating the ink makes it possible to maintain the ink at a suitable temperature easily using the heater unit.

In the inkjet printing apparatus of the seventh aspect, it is possible to replenish the supply tank with the ink.

In the inkjet printing apparatus of the eighth aspect, if the ink at a low temperature is added to the connection pipe, it is possible to heat the ink using the heater unit and then cause the ink to flow into the supply tank. This makes it possible to avoid flow of the ink at a low temperature into the supply tank.

In the inkjet printing apparatus of the ninth aspect, by controlling the heater unit on the basis of the replenishment temperature of the ink to be added to the supply tank, it becomes possible to maintain the ink in the supply tank at a suitable temperature even if the ink is at a low temperature in the replenishment tank.

In the inkjet printing apparatus of the tenth aspect, implementing feedback control over the heater unit allows the ink to be maintained at a suitable temperature.

In the inkjet printing apparatus of the eleventh aspect, it is possible to reduce the occurrence of a trouble caused by controlling the heater unit more than necessary.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
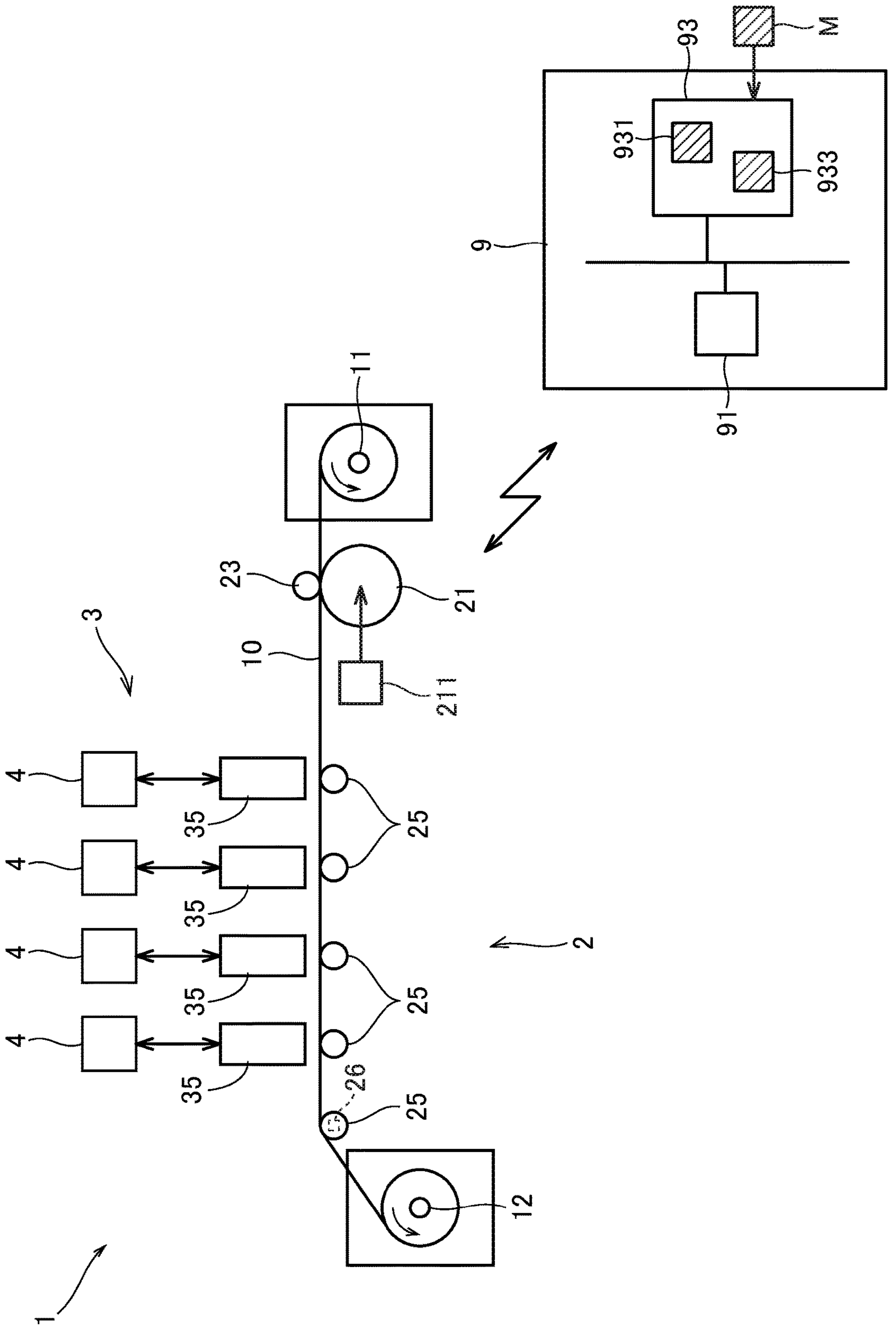
FIG. 1 shows the configuration of an inkjet printing apparatus according to a preferred embodiment.

A preferred embodiment of the present invention will be described below by referring to the accompanying drawings. Constituting elements in the preferred embodiment are described merely as examples, and the scope of the present invention is not to be limited only to these elements. To facilitate understanding, the size of each part or the number of such parts in the drawings may be illustrated in an exaggerated or simplified manner as needed.

1. Preferred Embodiment

FIG. 1 shows the configuration of an inkjet printing apparatus 1 according to a preferred embodiment. The inkjet printing apparatus 1 is a printer of an inkjet system, and records an image such as a character or a picture on a surface of an elongated strip-shape printing base material 10 by ejecting droplets of ink from a plurality of head units 35 toward the printing base material 10 while transporting the printing base material 10. The printing base material 10 is paper, for example. Alternatively, the printing base material 10 may be a base material made of a plastic film, cardboard, metallic foil, or glass, for example. In the inkjet printing apparatus 1, the ink ejected from the head unit 35 is aqueous ink, for example. Alternatively, the ink ejected from the head unit 35 may be oil-based ink or UV ink, for example.

As shown in FIG. 1, the inkjet printing apparatus 1 includes an unwinding roller 11, a take-up roller 12, a transport section 2, a printing section 3, and a control section 9.

The unwinding roller 11 unwinds the printing base material 10 wound in a roll shape and supplies the printing base material 10 to the transport section 2. The take-up roller 12 winds the printing base material 10 in a roll shape having been unwound by the unwinding roller 11. In the inkjet printing apparatus 1, the printing base material 10 is transported in a roll-to-roll system using the unwinding roller 11 and the take-up roller 12.

The transport section 2 transports the printing base material 10 having been supplied from the unwinding roller 11 to the take-up roller 12. In the following, a direction in which the transport section 2 transports the continuous paper 10 is called a "transport direction." The transport section 2 includes a drive roller 21, a nip roller 23, a plurality of transport rollers 25, and an encoder 26. The drive roller 21 is connected to a motor 211 and rotates actively in response to power from the motor 221. The nip roller 23 holds the printing base material 10 in between the nip roller 23 and the drive roller 21. The nip roller 23 presses the drive roller 21 through the printing base material 10, thereby generating grip force for the drive roller 21 to transport the printing base material 10. The transport rollers 25 are arranged at predetermined positions spaced from each other and support the continuous paper 10 along a predetermined path. The transport rollers 25 are actively rotatable. At least some of the transport rollers 25 may be configured to be actively rotatable. The encoder 26 detects the rotation of the transport roller 25, thereby detecting the amount of transport of the printing base material 10. As an example, the encoder 26 is a rotary encoder that outputs a pulse signal to the control section 9 each time the transport roller 25 rotates a certain angle.

The printing section 3 includes a plurality of (in this example, four) head units 35 and a plurality of (in this example, four) ink suppliers 4. The head units 35 have the same configuration. The ink suppliers 4 have the same configuration.

The head units 35 are arranged at positions separated from each other in the transport direction. Each head unit 35 ejects droplets of ink toward a surface of the printing base material 10. The head units 35 eject inks of colors differing from each other (for example, cyan, magenta, yellow, and black) to record images of respective single colors on the surface of the printing base material 10. Then, the single-color images of the colors differing from each other are superimposed to form a multi-color image on an upper surface of the printing base material 10. The number of the head units 35 may be one.

Figure 2:
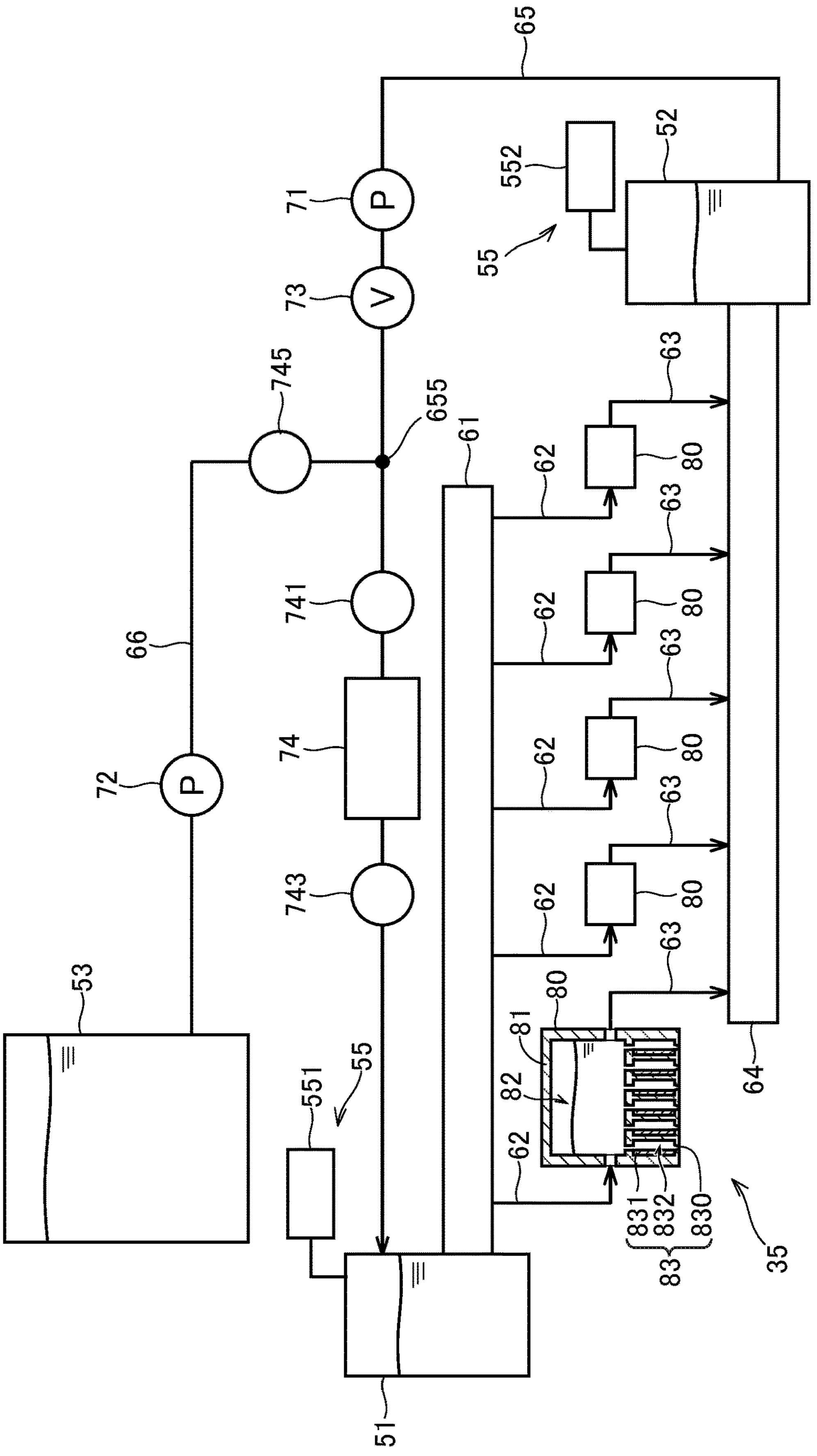
FIG. 2 conceptually shows the configurations of one ink supplier and one head unit.

FIG. 2 conceptually shows the configurations of one ink supplier 4 and one head unit 35. The head unit 35 includes a plurality of (in this example, five) ejection heads 80. The number of the ejection heads 80 provided at the head unit 35 may be one.

The ejection heads 80 have the same configuration. In FIG. 2, only one ejection head 80 is illustrated in detail and the other four ejection heads 80 are illustrated in a simplified manner. As shown in FIG. 2, the ejection head 80 includes a housing 81, an inner tank 82, and a plurality of nozzles 83.

The housing 81 forms an outer frame of the ejection head 80. The inner tank 82 is provided inside the housing 81. The inner tank 82 is capable of storing ink temporarily. The nozzles 83 are provided at a lower part of the housing 81 and equally spaced from each other in the transport direction and in a width direction of the printing base material 10. Each nozzle 83 communicates with the inner tank 82. Each nozzle 83 includes a piezoelectric element 831, an ink chamber 832, and an ejection opening 830. The piezoelectric element 831 is a pressure generating element. The ink chamber 832 communicates with the inner tank 82.

Ink in the inner tank 82 flows down into the ink chamber 832. When the ink in the ink chamber 832 is pressurized by the piezoelectric element 831, droplets of the ink are ejected from the ejection opening 830. The ink may be ejected by a system that is a so-called thermal system using a heater as a pressure generating element.

The ink supplier 4 supplies ink to the head unit 35. The ink supplier 4 of this example is a device that circulates ink by recovering the ink not having been ejected from the head unit 35 and returning the recovered ink to the head unit 35.

As shown in FIG. 2, the ink supplier 4 includes a supply tank 51, a recovery tank 52, a replenishment tank 53, one supply-side manifold 61, a plurality of (in this example, five) supply-side branch pipes 62, a plurality of (in this example, five) recovery-side branch pipes 63, a recovery-side manifold 64, a connection pipe 65, a replenishment pipe 66, a circulation pump 71, a replenishment pump 72, an anti-backflow on-off valve 73, a heater unit 74, an entrance temperature sensor 741, an exit temperature sensor 743, and a replenishment temperature sensor 745.

The supply tank 51 is a container that temporarily stores ink to be supplied to the head unit 35. The recovery tank 52 is a container that temporarily stores the ink recovered from the head unit 35. The supply tank 51 and the recovery tank 52 each have an inner chamber for storing the ink.

The supply-side branch pipes 62 are narrow pipes branching from the supply-side manifold 61. The supply-side manifold 61 and the supply-side branch pipes 62 form connection between the supply tank 51 and the ejection heads 80 of one head unit 35. More specifically, the supply-side manifold 61 has an upstream end connected to an exit of the inner chamber of the supply tank 51. Each supply-side branch pipe 62 has an upstream end connected to the supply-side manifold 61, and each supply-side branch pipe 62 has a downstream end connected to an entrance of the inner tank 82 of a corresponding one of the ejection heads 80.

The recovery-side branch pipes 63 are narrow pipes branching from the recovery-side manifold 64. The recovery-side branch pipes 63 and the recovery-side manifold 64 form connection between the ejection heads 80 of the head unit 35 and the recovery tank 52. More specifically, each recovery-side branch pipe 63 has an upstream end connected to an exit of the inner tank 82 of a corresponding one of the ejection heads 80, and each recovery-side branch pipe 63 has a downstream end connected to the recovery-side manifold 64. The recovery-side manifold 64 has a downstream end connected to an entrance of the inner chamber of the recovery tank 52.

As shown in FIG. 2, the ink supplier 4 includes a pressure difference generator 55. The pressure difference generator 55 generates a pressure difference between the inner chamber of the supply tank 51 and the inner chamber of the recovery tank 52 by regulating a pressure in the inner chamber of the supply tank 51 (inner pressure) and a pressure in the inner chamber of the recovery tank 52 (inner pressure).

The pressure difference generator 55 has a pressure regulator 551 and a pressure regulator 552. The pressure regulator 551 and the pressure regulator 552 are controlled by the control section 9. The pressure regulator 551 is capable of forming a positive pressure larger than atmospheric pressure as an inner pressure in the supply tank 51 by supplying gas to the inner chamber of the supply tank 51. The pressure regulator 552 is capable of forming a negative pressure smaller than atmospheric pressure as an inner pressure in the recovery tank 52 by sucking gas from the inner chamber of the recovery tank 52.

By the presence of a pressure difference generated by the pressure difference generator 55, ink stored in the supply tank 51 is fed to the inner tank 82 of each ejection head 80 through the supply-side manifold 61 and each supply-side branch pipe 62. By the presence of the pressure difference generated by the pressure difference generator 55, ink not having been ejected from each ejection head 80 is fed to the recovery tank 52 through each recovery-side branch pipe 63 and the recovery-side manifold 64. The pressure difference generator 55 corresponds to an example of a liquid feeder.

The connection pipe 65 connects the recovery tank 52 and the supply tank 51 to each other. As shown in FIG. 2, the connection pipe 65 has an upstream end communicably connected to the inner chamber of the recovery tank 52, and the connection pipe 65 has a downstream end communicably connected to the inner chamber of the supply tank 51. The connection pipe 65 is equipped with the circulation pump 71, the anti-backflow on-off valve 73, the heater unit 74, the entrance temperature sensor 741, and the exit temperature sensor 743. A downstream end of the replenishment pipe 66 is connected to a connection point 655 between the anti-backflow on-off valve 73 and the heater unit 74 along the connection pipe 65.

The circulation pump 71 performs liquid feed operation of feeding ink in the recovery tank 52 to the supply tank 51. The circulation pump 71 generates a flow of the ink from the recovery tank 52 toward the supply tank 51 in an inner passage of the connection pipe 65. Preferably, the circulation pump 71 is a diagraph pump where a foreign matter such as dust is unlikely to occur during driving. A flow rate at the circulation pump 71 is changed between several levels in response to a control signal output from the control section 9.

The anti-backflow on-off valve 73 is located downstream from the circulation pump 71 and upstream from the connection point 655 along the connection pipe 65. Opening and closing of the anti-backflow on-off valve 73 is controlled by the control section 9. Closing the anti-backflow on-off valve 73 interrupts the connection pipe 65. Specifically, while the anti-backflow on-off valve 73 is closed, backflow of ink from the connection point 655 toward the circulation pump 71 is avoided. Opening the anti-backflow on-off valve 73 provides communication through the connection pipe 65.

The heater unit 74 heats ink passing through the connection pipe 65. The heater unit 74 is located between the connection point 655 and the supply tank 51 along the connection pipe 65. The heater unit 74 is controlled by the control section 9.

The heater unit 74 has a band heater as a heat source. The band heater is wrapped around cement (heat conducting cement), and a spiral pipe for passage of ink is provided inside the cement. The ink passing through the pipe is increased in temperature across the cement. The presence of the cement improves heat efficiency. This makes it possible to reduce power consumption and to keep a maximum temperature required for the heat source low. Meanwhile, the presence of the cement reduces responsiveness in a direction of reducing a temperature. The heater unit 74 is shown as an example and may have a different configuration.

The entrance temperature sensor 741 measures an entrance temperature Tm1 on an entrance side of the heater unit 74 that is the temperature of ink to be fed to the heater unit 74. The entrance temperature sensor 741 corresponds to an example of an “entrance temperature measuring part.” The entrance temperature sensor 741 transmits a signal indicating the measured entrance temperature Tm1 to the control section 9.

The exit temperature sensor 743 measures an exit temperature Tm2 on an exit side of the heater unit 74 that is the temperature of ink discharged from the heater unit 74. The exit temperature sensor 743 corresponds to an example of an “exit temperature measuring part.” The exit temperature sensor 743 transmits a signal indicating the measured exit temperature Tm2 to the control section 9.

The control section 9 controls the heater unit 74 using temperatures measured by the entrance temperature sensor 741 and the exit temperature sensor 743.

The replenishment tank 53 stores ink to be added to the supply tank 51. The replenishment tank 53 has an inner chamber capable of storing ink. The replenishment tank 53 is located outside a circulation flow path of ink circulating between the supply tank 51 and the recovery tank 52. The temperature of ink stored inside the replenishment tank 53 may be approximate to the temperature of an environment where the inkjet printing apparatus 1 is installed. Meanwhile, the temperature of the ink circulating in the ink circulation flow path is set at a temperature suitable for ejecting the ink from the ejection head 80, and in many cases, is higher or lower than the temperature of the ink stored in the replenishment tank 53. Hence, it is assumed that the ink at a temperature approximate to the environmental temperature is added from the replenishment tank 53 to the ink circulation flow path set at a constant temperature.

The replenishment pipe 66 connects the inner chamber of the replenishment tank 53 and the connection pipe 65 to each other communicably. As shown in FIG. 2, the replenishment pipe 66 has an upstream end connected to the inner chamber of the replenishment tank 53. The replenishment pipe 66 has a downstream end connected to the connection pipe 65 at the connection point 655. The connection point 655 is located between the circulation pump 71 and the supply tank 51 along the connection pipe 65. The connection point 655 is located between the anti-backflow on-off valve 73 and the supply tank 51 along the connection pipe 65. The replenishment pipe 66 is equipped with the replenishment pump 72 and the replenishment temperature sensor 745.

The replenishment pump 72 performs liquid feed operation of feeding ink from the replenishment tank 53 to the connection pipe 65. The replenishment pump 72 is a diagraph pump, for example. The amount of the ink to be fed by the replenishment pump 72 is changed between several levels including a liquid feed amount 0 in response to a control signal output from the control section 9. The amount of the ink to be fed by the replenishment pump 72 is changed in conjunction with the amount of ink ejected from the head unit 35.

The replenishment temperature sensor 745 measures a replenishment temperature Tm3 in the replenishment pipe 66 that is the temperature of ink fed from the replenishment tank 53 to the connection pipe 65. The replenishment temperature sensor 745 transmits a signal indicating the measured replenishment temperature Tm3 to the control section 9.

The control section 9 is an information processor for controlling each part of the inkjet printing apparatus 1. As shown in FIG. 1, the control section 9 includes a processor 91 and a storage part 93. The processor 91 includes a central processing unit (CPU), for example. The storage part 93 includes a random access memory (RAM), a read-only memory (ROM), or an auxiliary storage device such as a hard disk drive. The storage part 93 stores a program 931 for implementation of a printing process of performing printing while transporting the printing base material 10 or implementation of a supply process of supplying ink to the head unit 35.

The program 931 is provided to the control section 9 through a recording medium M, for example. The program 931 is recorded in the recording medium M in a manner readable by the control section 9 as a computer. The recording medium M is a universal serial bus (USB) memory, an optical disc such as a digital versatile disc (DVD), or a magnetic disc, for example. Alternatively, the program 931 may be provided to the control section 9 through a network such as the Internet. The storage part 93 stores printing data 933 indicating an image to be recorded on the printing base material 10.

Figure 3:
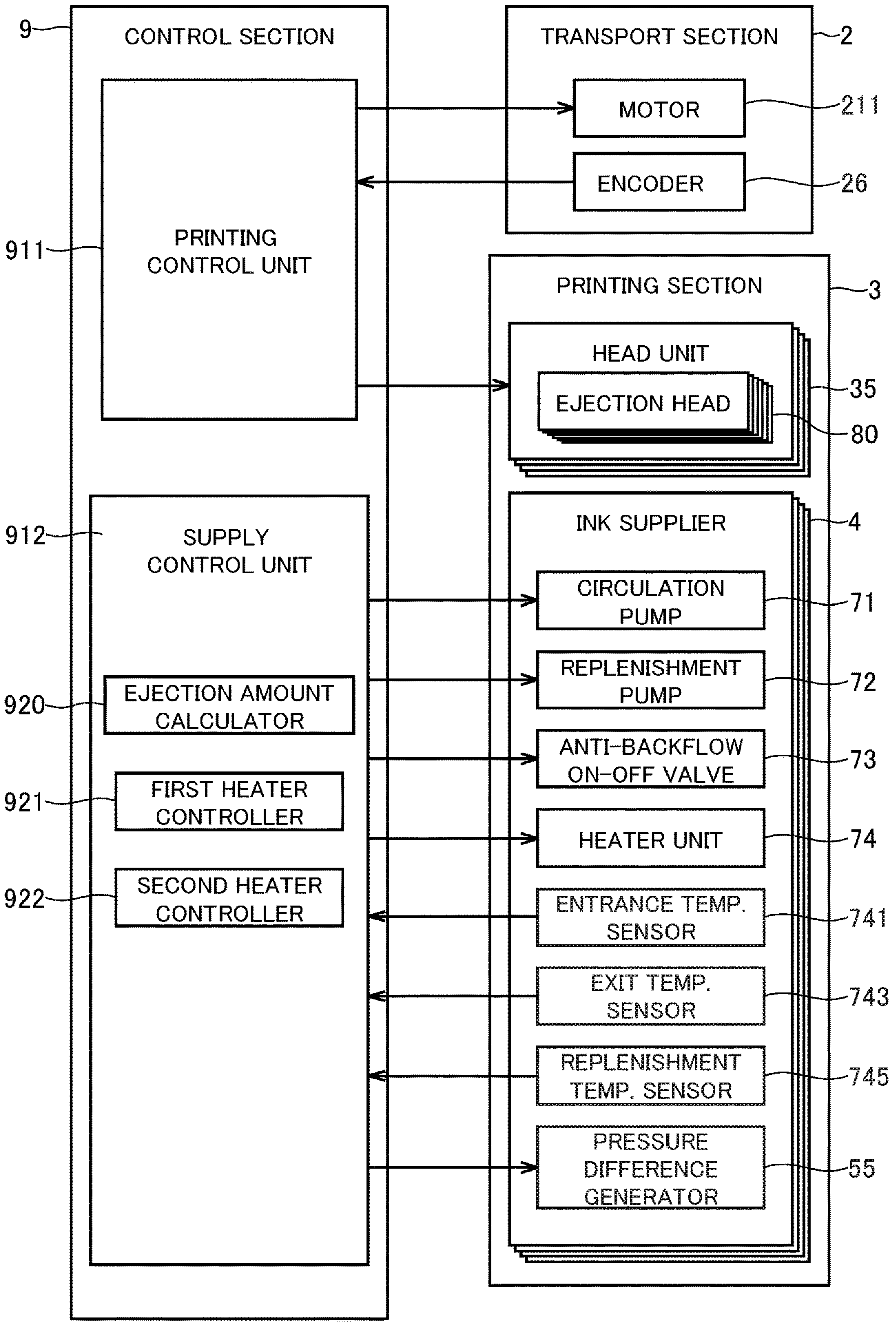
FIG. 3 is a functional block diagram showing connection between a control section and each part of the inkjet printing apparatus.

FIG. 3 is a functional block diagram showing connection between the control section 9 and each part of the inkjet printing apparatus 1. As shown in FIG. 3, the control section 9 includes a printing control unit 911 and a supply control unit 912. The printing control unit 911 and the supply control unit 912 are functions realized by execution of the program 931 by the processor 91.

The printing control unit 911 performs the printing process by controlling the transport section 2 and each head unit 35. The printing control unit 911 is electrically connected to the motor 211 and the encoder 26 of the transport section 2, and to the plurality of head units 35. The printing control unit 911 transports the printing base material 10 by controlling the motor 211 of the transport section 2. The printing control unit 911 causes each ejection head 80 of each head unit 35 to eject ink on the basis of a signal output from the encoder 26 of the transport section 2 and the printing data 933. By doing so, an intended image is printed on the printing base material 10.

The supply control unit 912 supplies ink to the inner tank 82 of each head unit 35 by controlling the ink supplier 4. The supply control unit 912 is electrically connected to the circulation pump 71, the replenishment pump 72, the anti-backflow on-off valve 73, the heater unit 74, the entrance temperature sensor 741, the exit temperature sensor 743, the replenishment temperature sensor 745, and the pressure difference generator 55 provided at each ink supplier 4.

The supply control unit 912 controls the circulation pump 71 and the replenishment pump 72 on the basis of an ink remaining amount in each of the supply tank 51 and the recovery tank 52, for example. The ink remaining amount in each of the supply tank 51 and the recovery tank 52 is measured by a level sensor not shown in the drawings, for example. The supply control unit 912 controls the circulation pump 71, thereby feeding ink in the recovery tank 52 to the supply tank 51 before the supply tank 51 becomes short of the ink remaining therein. Furthermore, by controlling the replenishment pump 72 on the basis of the ink remaining amount, ink is fed from the replenishment tank 53 to the supply tank 51 before the supply tank 51 becomes short of the ink remaining therein.

The supply control unit 912 may control the replenishment pump 72 in such a manner that the supply tank 51 is replenished with ink of an amount substantially equal to that of ink ejected from the plurality of ejection heads 80. By doing so, the amount of the ink in the supply tank 51 is maintained substantially constantly, thereby avoiding shortage of the ink.

The supply control unit 912 includes an ejection amount calculator 920, a first heater controller 921, and a second heater controller 922. On the basis of the printing data 933, the ejection amount calculator 920 calculates an ejection amount of ink to be ejected from the plurality of ejection heads 80 at a moment after the present moment. In this example, the ejection amount calculator 920 calculates a total ejection amount AT of the ink to be ejected from the plurality of ejection heads 80 in a certain period T after passage of predetermined time from the present moment. The total ejection amount AT is a sum of the amounts of the ink to be ejected in the certain period T from the plurality of ejection heads 80 belonging to one head unit 35. More specifically, the ejection amount of the ink to be used may be a printing percentage or a dot area ratio indicated by the printing data 933. The printing ratio or the dot area ratio is information indicating the amount of the ink to be ejected to a target area that is each of a plurality of areas defined by virtually dividing a surface of the printing base material 10 at regular intervals in the transport direction.

The first heater controller 921 controls the heater unit 74 on the basis of the entrance temperature Tm1 measured by the entrance temperature sensor 741 and an ejection amount calculated by the ejection amount calculator 920. The second heater controller 922 controls the heater unit 74 on the basis of the exit temperature Tm2 of ink measured by the exit temperature sensor 743. The first heater controller 921 implements feedforward control. The second heater controller 922 implements feedback control.

Figure 4:
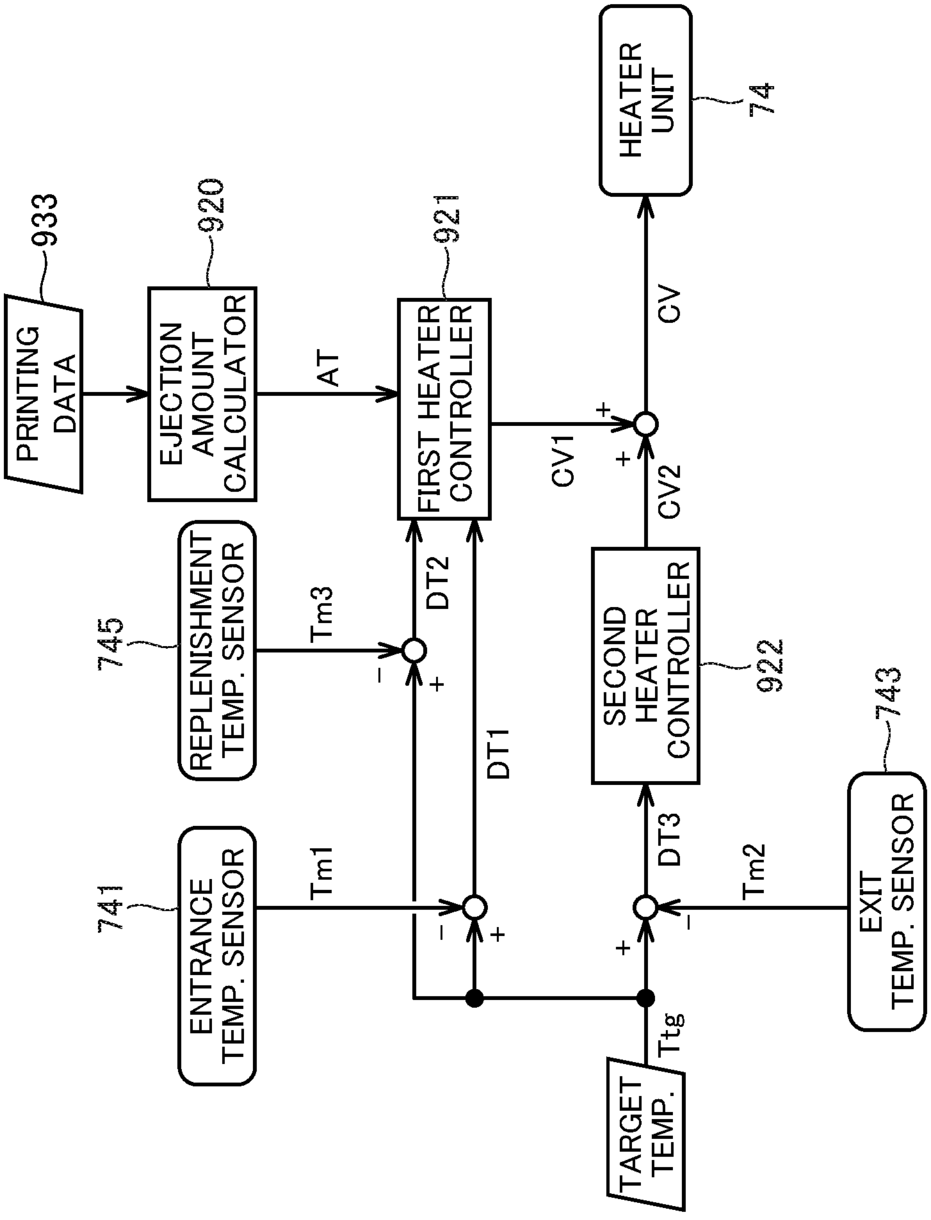
FIG. 4 is a control block diagram for controlling a heater unit.

FIG. 4 is a control block diagram for controlling the heater unit 74. As shown in FIG. 4, the first heater controller 921 outputs a command value CV1 to the heater unit 74. The second heater controller 922 outputs a command value CV2 to the heater unit 74. The command values CV1 and CV2 indicate power values to be applied to the heater of the heater unit 74, for example. In this example, a command value CV determined by adding the command values CV1 and CV2 is input to the heater unit 74.

The first heater controller 921 outputs the command value CV1 in such a manner that the exit temperature Tm2 becomes equal to a previously set target temperature Ttg. A temperature difference DT1 and a temperature difference DT2 are input to the first heater controller 921. The temperature difference DT1 is data indicating a difference between the target temperature Ttg and the entrance temperature Tm1 measured by the entrance temperature sensor 741. The temperature difference DT2 is data indicating a difference between the target temperature Ttg and the replenishment temperature Tm3 measured by the replenishment temperature sensor 745. The total ejection amount AT output from the ejection amount calculator 920 is input to the first heater controller 921. In this way, the first heater controller 921 outputs the command value CV1 responsive to the total ejection amount AT, the temperature difference DT1, and the temperature difference DT2.

The second heater controller 922 outputs the command value CV2 in such a manner that the exit temperature Tm2 becomes equal to the previously set target temperature Ttg. A temperature difference DT3 is input to the second heater controller 922. The temperature difference DT3 is data indicating a difference between the target temperature Ttg and the exit temperature Tm2 measured by the exit temperature sensor 743. In this way, the second heater controller 922 outputs the command value CV2 responsive to the input temperature difference DT3.

Figure 5:
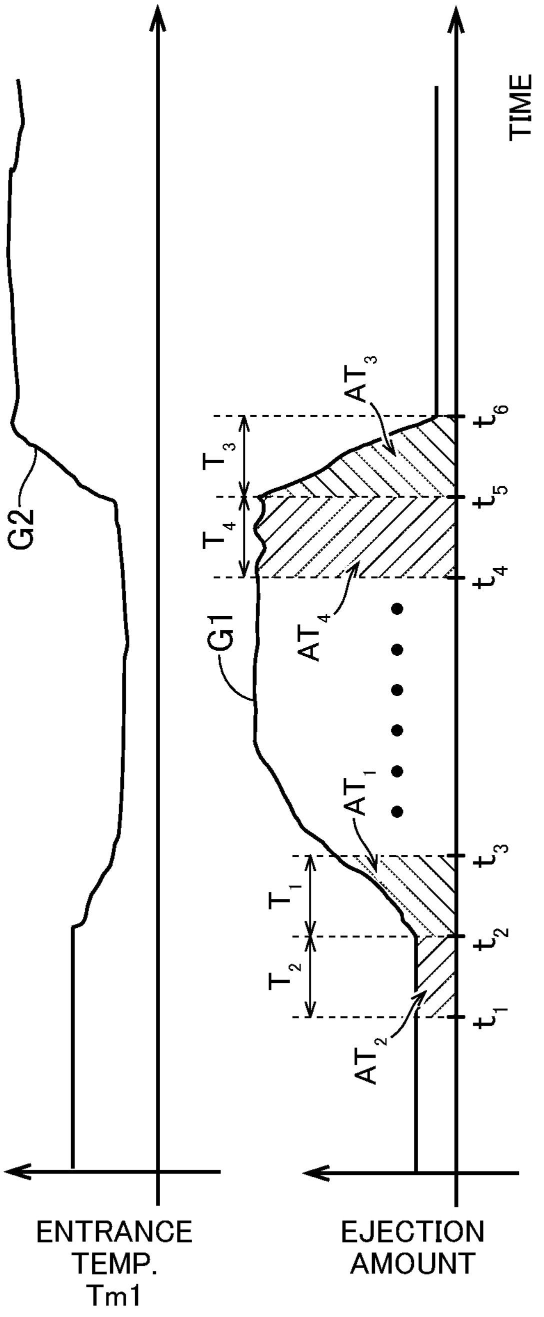
FIG. 5 shows exemplary temporal change in an ejection amount and exemplary temporal change in an entrance temperature.

FIG. 5 shows exemplary temporal change in an ejection amount and exemplary temporal change in the entrance temperature Tm1. In the example shown in FIG. 5, the ejection amount starts to increase largely after time $t_2$. In response to this, the entrance temperature Tm1 starts to decrease. Such decrease in the entrance temperature Tm1 is caused by addition of unused ink at a low temperature from the replenishment tank 53 to the connection pipe 65. The ejection amount starts to decrease largely after time $t_5$. In response to this, the entrance temperature Tm1 starts to increase. Such increase in the entrance temperature Tm1 is caused by stop of addition of the low-temperature ink from the replenishment tank 53.

As described above, the temperature of ink to flow into the heater unit 74 changes in response to the increase or decrease in the amount of ink ejected from the plurality of ejection heads 80. In this regard, the first heater controller 921 drives the heater unit 74 in advance in response to the increase or decrease in the ink ejection amount. To detect the increase or decrease in the ink ejection amount, the total ejection amount AT ejected in the certain period T is calculated by the ejection amount calculator 920, as shown in FIG. 5. The total ejection amount AT corresponds to an integrated value (integral value) of the ink ejection amount per unit time.

Figure 6:
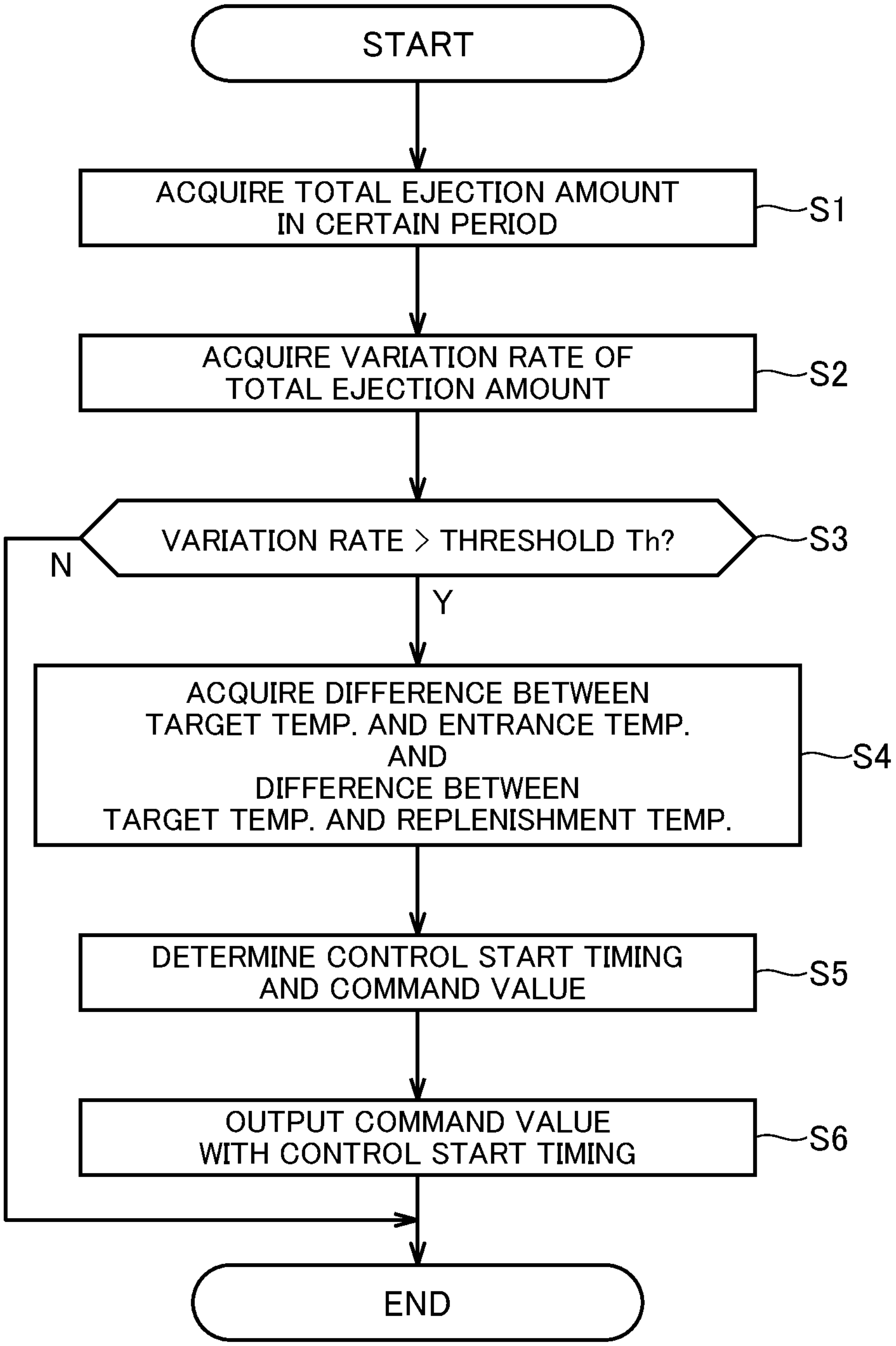
FIG. 6 shows a control flow implemented by a first heater controller.

FIG. 6 shows a control flow implemented by the first heater controller 921. The first heater controller 921 implements the control flow shown in FIG. 6 repeatedly while the inkjet printing apparatus 1 performs printing.

First, the first heater controller 921 acquires the total ejection amount AT in the certain period T after the present moment (total ejection amount acquiring step S1) calculated by the ejection amount calculator 920. Then, the first heater controller 921 calculates a variation rate of the total ejection amount AT (variation rate calculating step S2). More specifically, the ratio of the total ejection amount AT acquired in the total ejection amount acquiring step S1 to the total ejection amount AT acquired immediately before (the value of a ratio) is calculated as the variation rate of the total ejection amount AT. The first heater controller 921 judges whether the calculated variation rate exceeds a predetermined threshold Th (judging step S3). The variation rate of the total ejection amount AT is an example of a variation amount indicating variation in the total ejection amount AT.

In the example shown in FIG. 5, for example, a variation rate of a total ejection amount $AT_1$ in a certain period $T_1$ (from time $t_2$ to time $t_3$) is a value calculated by dividing the total ejection amount $AT_1$ by a total ejection amount $AT_2$ in a certain period $T_2$ (from time $t_1$ to time $t_2$) immediately before ($=AT_1/AT_2$). Likewise, a variation rate of a total ejection amount $AT_3$ in a certain period $T_3$ (from time $t_5$ to time $t_6$) is a value calculated by dividing the total ejection amount $AT_3$ by a total ejection amount $AT_4$ in a certain period $T_4$ (from time $t_4$ to time $t_5$) immediately before ($=AT_3/AT_4$).

In the variation rate calculating step S2, a difference between the total ejection amount $AT_1$ and the total ejection amount $AT_2$ immediately before ($=AT_1-AT_2$) may be calculated as a variation amount instead of calculating the variation rate. Then, in the judging step S3, it is judged whether the calculated difference (variation amount) exceeds the threshold Th.

If the variation rate of the total ejection amount AT is judged to exceed the threshold Th in the judging step S3, the first heater controller 921 acquires the temperature difference DT1 and the temperature difference DT2 (temperature difference acquiring step S4). The temperature difference DT1 is a temperature difference between the target temperature Ttg and the entrance temperature Tm1 at the present moment. The temperature difference DT2 is a temperature difference between the target temperature Ttg and the replenishment temperature Tm3 at the present moment.

Next, the first heater controller 921 determines control start timing and the command value CV1 (determining step S5). The control start timing is data indicating time when the first heater controller 921 is to output the command value CV1 to the entrance temperature sensor 741. The control start timing indicates time before start time of the certain period T when variation is assumed to occur. Specifically, the command value CV1 is newly applied to the heater unit 74 with timing earlier than the time when variation in the total ejection amount AT is to occur, thereby controlling the heater unit 74 so as to make the heater unit 74 responsive to the variation in the total ejection amount AT.

The control start timing is determined in response to the heater capacity of the heater unit 74, for example. With increase in the heater capacity of the heater unit 74, it is more difficult for the heater unit 74 to get hot and get cold. Thus, even with the same variation rate of the total ejection amount AT, the control start timing is set to earlier time in response to increase in the heater capacity. By determining the control start timing in response to the heater capacity in this way, delay in heating and cooling of the heater unit 74 is reduced, making it possible to reduce the occurrence of overcooling or overheating of ink. Characteristics relating to the heater capacity of the heater unit 74 (temperature rising characteristics and temperature falling characteristics) are approximated by a transfer function of a first-order lag system, for example.

The control start timing is determined in response to the degree of the variation rate and the degrees of the temperature differences DT1 and DT2. The control start timing is set earlier as the variation rate becomes greater or as the temperature differences DT1 and DT2 become larger.

The first heater controller 921 determines the command value CV1 on the basis of the variation rate acquired in the variation rate calculating step S2 and the temperature differences DT1 and DT2 acquired in the temperature difference acquiring step S4.

After the determining step S5, the first heater controller 921 outputs the determined command value CV1 to the heater unit 74 in coincidence with arrival of the control start timing (output step S6).

If the variation rate is judged not to exceed the threshold Th in the judging step S3, the first heater controller 921 finishes the process. Specifically, if the variation rate is equal to or less than the threshold Th, the feedforward control is not implemented. If there is a capacity of storing ink of a certain amount or more like in the supply tank 51 or the supply-side manifold 61, for example, this capacity is sufficient for absorbing relatively small change in the temperature of the ink. In this regard, by setting the threshold Th, it becomes possible to reduce the occurrence of a trouble caused by controlling the heater unit 74 more than necessary.

Figure 7:
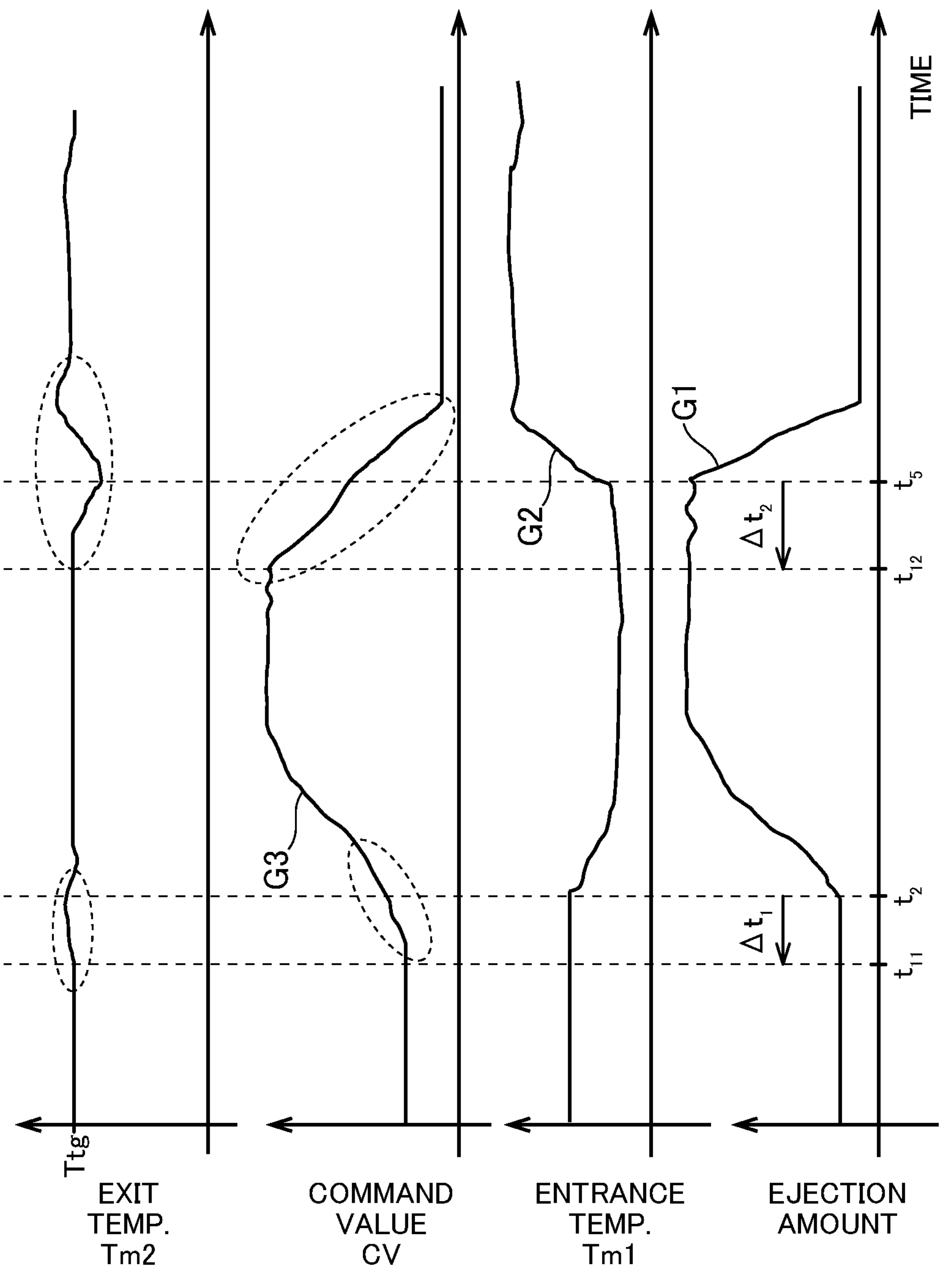
FIG. 7 shows the exemplary temporal change in the ejection amount and the exemplary temporal change in the entrance temperature in FIG. 5, and exemplary temporal change in a command value applied to the heater unit and exemplary temporal change in an exit temperature.

FIG. 7 shows the exemplary temporal change in the ejection amount and the exemplary temporal change in the entrance temperature Tm1 in FIG. 5, and exemplary temporal change in the command value CV applied to the heater unit 74 and exemplary temporal change in the exit temperature Tm2. A graph G1 of the ejection amount and a graph G2 of the entrance temperature Tm1 in FIG. 7 are the same as a graph G1 of the ejection amount and a graph G2 of the entrance temperature Tm1 in FIG. 5 respectively.

As shown in FIG. 7, in order to respond to the total ejection amount $AT_1$ after the time $t_2$, the first heater controller 921 determines control start timing (time $t_{11}$) and the command value CV1 in the determining step S5 shown in FIG. 6 that are responsive to the variation rate of the total ejection amount $AT_1$ and the temperature differences DT1 and DT2. Then, in the output step S6, the first heater controller 921 outputs the determined command value CV1 at the time $t_{11}$ before the time $t_2$ by $\Delta t_1$. This makes the command value CV applied to the heater unit 74 start to increase from the time $t_{11}$ as shown in a region surrounded by dashes on a graph G3. As a result, output from the heater unit 74 starts to be intensified from the time $t_{11}$ before the time $t_2$ when the entrance temperature Tm1 is to decrease. While the exit temperature Tm2 starts to become higher than the target temperature Ttg (35° C.) slightly for a short time from the time $t_{11}$, the exit temperature Tm2 is thereafter maintained substantially at the target temperature Ttg.

As shown in FIG. 7, in order to respond to the total ejection amount $AT_3$ after the time $t_5$, the first heater controller 921 determines control start timing (time $t_{12}$) and the command value CV1 in the determining step S5 shown in FIG. 6 that are responsive to the variation rate of the total ejection amount $AT_3$. Then, in the output step S6, the first heater controller 921 outputs the determined command value CV1 at the time $t_{12}$ before the time $t_5$ by $\Delta t_2$. This makes the command value CV applied to the heater unit 74 start to decrease from the time $t_{12}$ as shown in a region surrounded by dashes on the graph G3. As a result, output from the heater unit 74 starts to be weakened from the time $t_{12}$ before the time $t_5$ when the entrance temperature Tm1 is to increase. While the exit temperature Tm2 starts to become lower than the target temperature Ttg (35° C.) slightly for a short time from the time $t_{12}$, the exit temperature Tm2 is thereafter maintained substantially at the target temperature Ttg.

As described above, the inkjet printing apparatus 1 of the present preferred embodiment includes the ejection head 80, the ink supplier 4, the heater unit 74, the ejection amount calculator 920, and the first heater controller 921. The ejection head 80 includes a plurality of the nozzles 83 for ejecting ink to a surface of the printing base material 10. The ink supplier 4 supplies the ink to the ejection head 80. The heater unit 74 heats the ink to be supplied to the ejection head 80. The ejection amount calculator 920 calculates an ejection amount of the ink to be ejected from the ejection head 80 at a moment after the present moment on the basis of the printing data 933 indicating an image to be recorded on the printing base material 10. The first heater controller 921 controls the heater unit 74 on the basis of the ejection amount calculated by the ejection amount calculator 920. In this configuration, as the heater unit 74 is controlled on the basis of the ejection amount at the moment after the present moment, it is possible to reduce delay in heating or cooling the heater unit 74 in response to variation in the ejection amount. This makes it possible to reduce the occurrence of overcooling or overheating of the ink by the heater unit 74 even if the used heater unit 74 has a large heater capacity.

The ejection amount calculator 920 calculates the total ejection amount AT of the ink to be ejected from the ejection head 80 in the certain period T after the present moment. The first heater controller 921 controls the heater unit 74 on the basis of the total ejection amount AT calculated by the ejection amount calculator 920. In this configuration, calculating the total ejection amount AT in the certain period T makes it possible to determine variation in the ejection amount with high accuracy, thereby allowing the heater unit 74 to be controlled properly.

The first heater controller 921 determines control start timing for controlling the heater unit 74 on the basis of the ejection amount calculated by the ejection amount calculator 920 and the heater capacity of the heater unit 74. The first heater controller 921 controls the heater unit 74 in coincidence with arrival of the determined control start timing. In this configuration, the control start timing is determined on the basis of the heater capacity. Thus, even if the used heater unit 74 has a large heater capacity, it is still possible to reduce the occurrence of overcooling or overheating of the ink by the heater unit 74.

The inkjet printing apparatus 1 further includes the entrance temperature sensor 741 (entrance temperature measuring part). The entrance temperature sensor 741 measures the entrance temperature Tm1 of the ink to be fed to the heater unit 74 on the entrance side of the heater unit 74. The first heater controller 921 controls the heater unit 74 on the basis of the entrance temperature Tm1 further measured by the entrance temperature sensor 741. In this configuration, controlling the heater unit 74 on the basis of the entrance temperature Tm1 allows the ink to be maintained at a suitable temperature.

The ink supplier 4 includes the supply tank 51, the supply-side manifold 61, and the supply-side branch pipe 92 (supply pipe). The supply tank 51 stores the ink to be supplied to the ejection head 80. The supply-side manifold 61 and the supply-side branch pipe 62 form connection between the supply tank 51 and the ejection head 80. In this configuration, as the ink is stored in the supply tank 51, it is possible to reduce variation in the temperature of the ink to be supplied to the ejection head 80.

The ink supplier 4 includes the recovery tank 52, the connection pipe 65, and the circulation pump 71. The recovery tank 52 stores the ink recovered from the ejection head 80. The connection pipe 65 forms connection between the recovery tank 52 and the supply tank 51. The circulation pump 71 is provided in the connection pipe 65 and used for feeding the ink from the recovery tank 52 to the supply tank 51. In this configuration, circulating the ink makes it possible to maintain the ink at a suitable temperature easily using the heater unit 74.

The ink supplier 4 includes the replenishment tank 53, the replenishment pipe 66, and the replenishment pump 72. The replenishment tank 53 stores the ink to be added to the supply tank 51. The replenishment pipe 66 forms connection between the replenishment tank 53 and the connection pipe 65. The replenishment pump 72 is provided in the replenishment pipe 66 and used for feeding the ink in the replenishment tank 53 to the connection pipe 65. In this configuration, it is possible to replenish the supply tank 51 with the ink.

The heater unit 74 is located between the connection point 655 to which the replenishment pipe 66 is connected and the supply tank 51 along the connection pipe 65. In this configuration, if the ink at a low temperature is added to the connection pipe 65, it is possible to heat the ink using the heater unit 74 and then cause the ink to flow into the supply tank 51. This makes it possible to avoid flow of the ink at a low temperature into the supply tank 51.

The inkjet printing apparatus 1 further includes the replenishment temperature sensor 745 (replenishment temperature measuring part). The replenishment temperature sensor 745 measures the replenishment temperature Tm3 of the ink to be added from the replenishment tank 53 to the supply tank 51. The first heater controller 921 controls the heater unit 74 on the basis of the replenishment temperature Tm3 further measured by the replenishment temperature sensor 745. In this configuration, by controlling the heater unit 74 on the basis of the replenishment temperature Tm3 of the ink to be added to the supply tank 51, it becomes possible to maintain the ink in the supply tank 51 at a suitable temperature even if the ink is at a low temperature in the replenishment tank 53.

The inkjet printing apparatus 1 further includes the exit temperature sensor 743 (exit temperature measuring part) and the second heater controller 922. The exit temperature sensor 743 measures the temperature of the ink discharged from the heater unit 74 on the exit side of the heater unit 74. The second heater controller 922 controls the heater unit 74 on the basis of the temperature of the ink measured by the exit temperature sensor 743. In this configuration, implementing feedback control over the heater unit 74 allows the ink to be maintained at a suitable temperature.

The first heater controller 921 judges whether a variation rate indicating variation in the total ejection amount AT calculated by the ejection amount calculator 920 exceeds the threshold Th (judging step S3). If the variation is judged to exceed the threshold Th, the first heater controller 921 controls the heater unit 74 on the basis of the total ejection amount AT. In this configuration, it is possible to reduce the occurrence of a trouble caused by controlling the heater unit 74 more than necessary.

The inkjet printing apparatus 1 includes a plurality of the ejection heads 80, and the ejection amount calculator 920 calculates ejection amounts of the ink to be ejected from the plurality of ejection heads 80.

2. Modifications

While the preferred embodiment has been described hereinabove, the present invention is not limited to the foregoing preferred embodiment but can be modified in various ways.

In the above-described embodiment, the first heater controller 921 controls the heater unit 74 on the basis of the total ejection amount AT in the certain period T, for example. Alternatively, instead of using the total ejection amount AT, the first heater controller 921 may control the heater unit 74 on the basis of an ejection amount per unit time at a moment after the present moment.

The heater unit 74 may be configured to heat ink at a plurality of places in the inkjet printing apparatus 1. In another case, the heater unit 74 may be located in the replenishment pipe 66 and configured to heat ink flowing in the replenishment pipe 66. In this case, if the ink added from the replenishment tank 53 is at a low temperature, it is possible to heat the ink before the ink flows into a circulation path.

If the exit temperature Tm2 exceeds a set temperature, the supply control unit 912 may forcibly reduce or stop output from the heater unit 74. For example, the first heater controller 921 may be configured in such a manner that, if the exit temperature Tm2 measured by the exit temperature sensor 743 exceeds the set temperature, the first heater controller 921 does not output the command value CV1. This configuration makes it possible to prevent the exit temperature Tm2 from becoming a high temperature as a result of the feedforward control. Thus, it is possible to avoid alteration of an ink component due to overheating and avoid reduction in printing quality due to the alternation of the ink component.

In the above-described preferred embodiment, the amount of ink to be fed by the replenishment pump 72 is changed in conjunction with the amount of the ink ejected from the head unit 35. If an ink reservoir (a member such as the ink supply tank 51 in the above-described preferred embodiment capable of storing ink of a certain amount) is present between the head unit 35 and the replenishment tank 53, supply and non-supply of the ink by the replenishment pump 72 may be switched or the amount of the ink to be fed by the replenishment pump 72 may be changed on the basis of the amount of the ink stored in the ink reservoir. Specifically, the amount of the ink stored in the ink reservoir is detected using a suitable ink level sensor, and supply and non-supply of the ink by the replenishment pump 72 is switched or the amount of the ink to be fed by the replenishment pump 72 is changed on the basis of a signal from the ink level sensor. More specifically, if the amount of the ink ejected from the head unit 35 increases to reduce the amount of the ink remaining in the ink reservoir, the control section 9 controls the replenishment pump 72 on the basis of a signal from the ink level sensor to replenish the ink reservoir with the ink.

In this case, it is desirable that the first heater controller 921 generate the command value CV1 by giving consideration to the amount of the ink remaining in the ink reservoir output from the ink level sensor in addition to the total ejection amount AT calculated by the ejection amount calculator 920 on the basis of the printing data 933, the entrance temperature Tm1 output from the entrance temperature sensor 741, and the replenishment temperature Tm3 output from the replenishment temperature sensor 745.

In the above-described preferred embodiment, the temperature of replenishment ink is measured by the replenishment temperature sensor 745 interposed in the replenishment pipe 66. However, the replenishment temperature sensor 745 is not an essential. A temperature detected by the entrance temperature sensor 741 may be used as the temperature of the replenishment ink.

In the above-described preferred embodiment, the inkjet printing apparatus 1 is configured to make a print on the printing base material 10 transported in a roll-to-roll system. Alternatively, the inkjet printing apparatus 1 may be configured to make a print on a sheet-fed base material such as sheet paper.

While the invention has been shown and described in detail, the foregoing description is in all aspects illustrative and not restrictive. It is therefore understood that numerous modifications and variations can be devised without departing from the scope of the invention.

What is claimed is:

1. An inkjet printing apparatus comprising:
at least one ejection head with a plurality of nozzles for ejecting ink to a surface of a printing base material;
a heater unit that heats said ink to be supplied to said ejection head;
an ink supplier that supplies the ink heated by said heater unit to said ejection head via a pipe;
an ejection amount calculator that calculates an ejection amount of said ink to be ejected from said ejection head at a moment after the present moment on the basis of printing data indicating an image to be recorded on said printing base material; and
a first heater controller that, while said ejection head is ejecting ink onto said printing base material, controls said heater unit in a feedforward manner on the basis of said ejection amount calculated by said ejection amount calculator.

2. The inkjet printing apparatus according to claim 1, wherein
said ejection amount calculator calculates a total ejection amount of said ink to be ejected from said ejection head in a certain period after the present moment, and
said first heater controller controls said heater unit on the basis of said total ejection amount calculated by said ejection amount calculator.

3. The inkjet printing apparatus according to claim 2, wherein
said first heater controller determines control start timing for controlling said heater unit on the basis of said ejection amount calculated by said ejection amount calculator and the heater capacity of said heater unit, and controls said heater unit in coincidence with arrival of said control start timing thereby determined.

4. The inkjet printing apparatus according to claim 1, further comprising:
an entrance temperature measuring part that measures an entrance temperature of said ink to be fed to said heater unit on an entrance side of said heater unit, wherein
said first heater controller controls said heater unit on the basis of said entrance temperature further measured by said entrance temperature measuring part.

5. The inkjet printing apparatus according to claim 1, wherein said ink supplier includes:

a supply tank that stores said ink to be supplied to said ejection head; and a supply pipe that forms connection between said supply tank and said ejection head.

6. The inkjet printing apparatus according to claim 5, wherein said ink supplier further includes:

a recovery tank that stores said ink recovered from said ejection head;

a connection pipe that forms connection between said recovery tank and said supply tank; and a circulation pump provided in said connection pipe and used for feeding said ink from said recovery tank to said supply tank.

7. The inkjet printing apparatus according to claim 6, wherein said ink supplier further includes:

a replenishment tank that stores said ink to be added to said supply tank;

a replenishment pipe that forms connection between said replenishment tank and said connection pipe; and a replenishment pump provided in said replenishment pipe and used for feeding said ink in said replenishment tank to said connection pipe.

8. The inkjet printing apparatus according to claim 7, wherein said heater unit is located between a connection point to which said replenishment pipe is connected and said supply tank along said connection pipe.

9. The inkjet printing apparatus according to claim 1, further comprising:

an exit temperature measuring part that measures the temperature of said ink discharged from said heater unit on an exit side of said heater unit; and a second heater controller that controls said heater unit on the basis of the temperature of said ink measured by said exit temperature measuring part.

10. The inkjet printing apparatus according to claim 1, wherein said first heater controller judges whether a variation amount indicating variation in said ejection amount calculated by said ejection amount calculator exceeds a threshold, and if said variation amount is judged to exceed said threshold, said first heater controller controls said heater unit on the basis of said ejection amount.

11. The inkjet printing apparatus according to claim 1, wherein said at least one ejection head includes a plurality of said ejection heads, and said ejection amount calculator calculates ejection amounts of said ink to be ejected from said plurality of ejection heads.

12. An inkjet printing apparatus comprising:

at least one ejection head with a plurality of nozzles for ejecting ink to a surface of a printing base material;

an ink supplier that supplies said ink to said ejection head, said ink supplier including:

a supply tank that stores said ink to be supplied to said ejection head;

a supply pipe that forms connection between said supply tank and said ejection head;

a recovery tank that stores said ink recovered from said ejection head;

a connection pipe that forms connection between said recovery tank and said supply tank;

a circulation pump provided in said connection pipe and used for feeding said ink from said recovery tank to said supply tank;

a replenishment tank that stores said ink to be added to said supply tank;

a replenishment pipe that forms connection between said replenishment tank and said connection pipe;

a replenishment pump provided in said replenishment pipe and used for feeding said ink in said replenishment tank to said connection pipe; and a replenishment temperature measuring part that measures a replenishment temperature of said ink to be added from said replenishment tank to said supply tank;

a heater unit that heats said ink to be supplied to said ejection head;

an ejection amount calculator that calculates an ejection amount of said ink to be ejected from said ejection head at a moment after the present moment on the basis of printing data indicating an image to be recorded on said printing base material; and a first heater controller that controls said heater unit on the basis of said ejection amount calculated by said ejection amount calculator and replenishment temperature further measured by said replenishment temperature measuring part.

* * * * *